(12) United States Patent
Lu

(10) Patent No.: US 8,426,998 B2
(45) Date of Patent: Apr. 23, 2013

(54) WIND-POWER AND HYDRAULIC GENERATOR APPARATUS

(76) Inventor: Shun-Tsung Lu, Wufong Hsiang (TW)

( * ) Notice: Subject to any disclaimer, the term of this patent is extended or adjusted under 35 U.S.C. 154(b) by 321 days.

(21) Appl. No.: 12/963,838

(22) Filed: Dec. 9, 2010

(65) Prior Publication Data

US 2012/0146334 A1 Jun. 14, 2012

(51) Int. Cl.
F03B 13/00 (2006.01)
H02P 9/04 (2006.01)
F03D 9/00 (2006.01)

(52) U.S. Cl.
USPC .................................. 290/54; 290/44; 290/55

(58) Field of Classification Search .................... 290/44, 290/54, 55
See application file for complete search history.

(56) References Cited

U.S. PATENT DOCUMENTS

| | | | | | |
|---|---|---|---|---|---|
| 1,342,318 | A | * | 6/1920 | Yanacopoulos | 416/52 |
| 1,369,596 | A | * | 2/1921 | Yanacopoulos | 417/336 |
| 2,454,058 | A | * | 11/1948 | Hays | 60/398 |
| 2,539,862 | A | * | 1/1951 | Rushing | 62/230 |
| 3,269,121 | A | * | 8/1966 | Ludwig | 60/398 |
| 3,515,889 | A | * | 6/1970 | Kammerer | 290/53 |
| 3,806,733 | A | * | 4/1974 | Haanen | 290/55 |
| 4,031,405 | A | * | 6/1977 | Asperger | 290/55 |
| 4,031,702 | A | * | 6/1977 | Burnett et al. | 60/398 |
| 4,055,950 | A | * | 11/1977 | Grossman | 60/398 |
| 4,137,015 | A | * | 1/1979 | Grossman | 417/366 |
| 4,149,092 | A | * | 4/1979 | Cros | 290/54 |
| 4,186,312 | A | * | 1/1980 | Dvorak | 290/4 R |
| 4,206,608 | A | * | 6/1980 | Bell | 60/698 |
| 4,229,661 | A | * | 10/1980 | Mead et al. | 290/44 |
| 4,239,977 | A | * | 12/1980 | Strutman | 290/44 |
| 4,274,010 | A | * | 6/1981 | Lawson-Tancred | 290/55 |
| 4,280,061 | A | * | 7/1981 | Lawson-Tancred | 290/55 |
| 4,304,103 | A | * | 12/1981 | Hamrick et al. | 62/228.1 |
| 4,447,738 | A | * | 5/1984 | Allison | 290/44 |
| 4,476,851 | A | * | 10/1984 | Brugger et al. | 126/247 |
| 4,496,846 | A | * | 1/1985 | Parkins | 290/44 |
| 4,496,847 | A | * | 1/1985 | Parkins | 290/44 |
| 4,498,017 | A | * | 2/1985 | Parkins | 290/44 |
| 4,613,760 | A | * | 9/1986 | Law | 290/1 C |
| 4,815,936 | A | * | 3/1989 | Stoltze et al. | 416/9 |
| 5,384,489 | A | * | 1/1995 | Bellac | 290/44 |
| 5,495,128 | A | * | 2/1996 | Brammeier | 290/55 |
| 7,183,664 | B2 | * | 2/2007 | McClintic | 290/55 |
| 7,436,086 | B2 | * | 10/2008 | McClintic | 290/55 |
| 7,569,943 | B2 | * | 8/2009 | Kovach et al. | 290/44 |
| 7,656,055 | B2 | * | 2/2010 | Torres et al. | 290/55 |
| 7,719,127 | B2 | * | 5/2010 | Bertolotti | 290/44 |
| 7,863,767 | B2 | * | 1/2011 | Chapple et al. | 290/54 |
| 7,932,620 | B2 | * | 4/2011 | Plant, Jr. | 290/55 |

(Continued)

Primary Examiner — Pedro J Cuevas
(74) Attorney, Agent, or Firm — C. G. Mersereau; Nikolai & Mersereau, P.A.

(57) ABSTRACT

A wind-power and hydraulic generator apparatus has a wind power device, a drive device, multiple pump devices, a reservoir device and a hydraulic device. When the wind blows, the wind power device generates and stores electricity and the drive device drives the pump devices to pump water into the reservoir device. Then the reservoir device generates a water jet enabling the hydraulic device to generate electricity. When the wind does not blow, the electricity stored in the wind power device still enables the water to circulate and to generate the water jet. Whether the wind blows or not, the water of the reservoir device can keep circulating to generate the water jet and the hydraulic device can keep generating electricity. Accordingly, the wind-power and hydraulic generator apparatus can use wind power to generate a water jet.

4 Claims, 5 Drawing Sheets

U.S. PATENT DOCUMENTS

| | | | |
|---|---|---|---|
| 8,106,527 B1* | 1/2012 | Carr | 290/54 |
| 8,203,229 B2* | 6/2012 | Stone | 290/55 |
| 8,324,750 B2* | 12/2012 | Bertolotti | 290/44 |
| 2007/0024058 A1* | 2/2007 | McClintic | 290/44 |
| 2007/0138798 A1* | 6/2007 | McClintic | 290/44 |
| 2009/0058095 A1* | 3/2009 | McClintic | 290/55 |
| 2009/0140522 A1* | 6/2009 | Chapple et al. | 290/43 |
| 2009/0230688 A1* | 9/2009 | Torres et al. | 290/55 |
| 2010/0270809 A1* | 10/2010 | Dahlhaug | 290/55 |
| 2010/0314873 A1* | 12/2010 | Stone | 290/44 |
| 2010/0320770 A1* | 12/2010 | Dahlhaug | 290/55 |
| 2011/0120108 A1* | 5/2011 | Garmong | 60/398 |
| 2011/0305557 A1* | 12/2011 | Lu | 415/116 |
| 2011/0309628 A1* | 12/2011 | Corts | 290/55 |
| 2012/0045328 A1* | 2/2012 | Rashidi | 416/1 |
| 2012/0061958 A1* | 3/2012 | Tsutsumi et al. | 290/44 |
| 2012/0061969 A1* | 3/2012 | Tsutsumi et al. | 290/55 |
| 2012/0161442 A1* | 6/2012 | Chapple | 290/44 |

* cited by examiner

WIND-POWER AND HYDRAULIC GENERATOR APPARATUS

BACKGROUND OF THE INVENTION

1. Field of the Invention

The present invention relates to a generator apparatus, and more particularly to a wind-power and hydraulic generator apparatus that uses wind power to generate a water jet.

2. Description of Related Art

A conventional hydraulic generator has a rotatable water turbine. A water jet generated by a water jet machine drives the water turbine to rotate. However, the water jet machine needs to be fed on extra electricity to generate the water jet and this is not economically efficient and ecologically friendly.

To overcome the shortcomings, the present invention tends to provide a wind-power and hydraulic generator apparatus to mitigate the aforementioned problems.

SUMMARY OF THE INVENTION

The main objective of the invention is to provide a wind-power and hydraulic generator apparatus that uses wind power to generate a water jet.

A wind-power and hydraulic generator apparatus has a wind power device, a drive device, multiple pump devices, a reservoir device and a hydraulic device. When the wind blows, the wind power device generates and stores electricity and the drive device drives the pump devices to pump water into the reservoir device. Then the reservoir device generates a water jet enabling the hydraulic device to generate electricity. When the wind does not blow, the electricity stored in the wind power device still enables the water to circulate and to generate the water jet. Whether the wind blows or not, the water of the reservoir device can keep circulating to generate the water jet and the hydraulic device can keep generating electricity. Accordingly, the wind-power and hydraulic generator apparatus can use wind power to generate a water jet.

Other objects, advantages and novel features of the invention will become more apparent from the following detailed description when taken in conjunction with the accompanying drawings.

DETAILED DESCRIPTION OF PREFERRED EMBODIMENT

Figure 1:
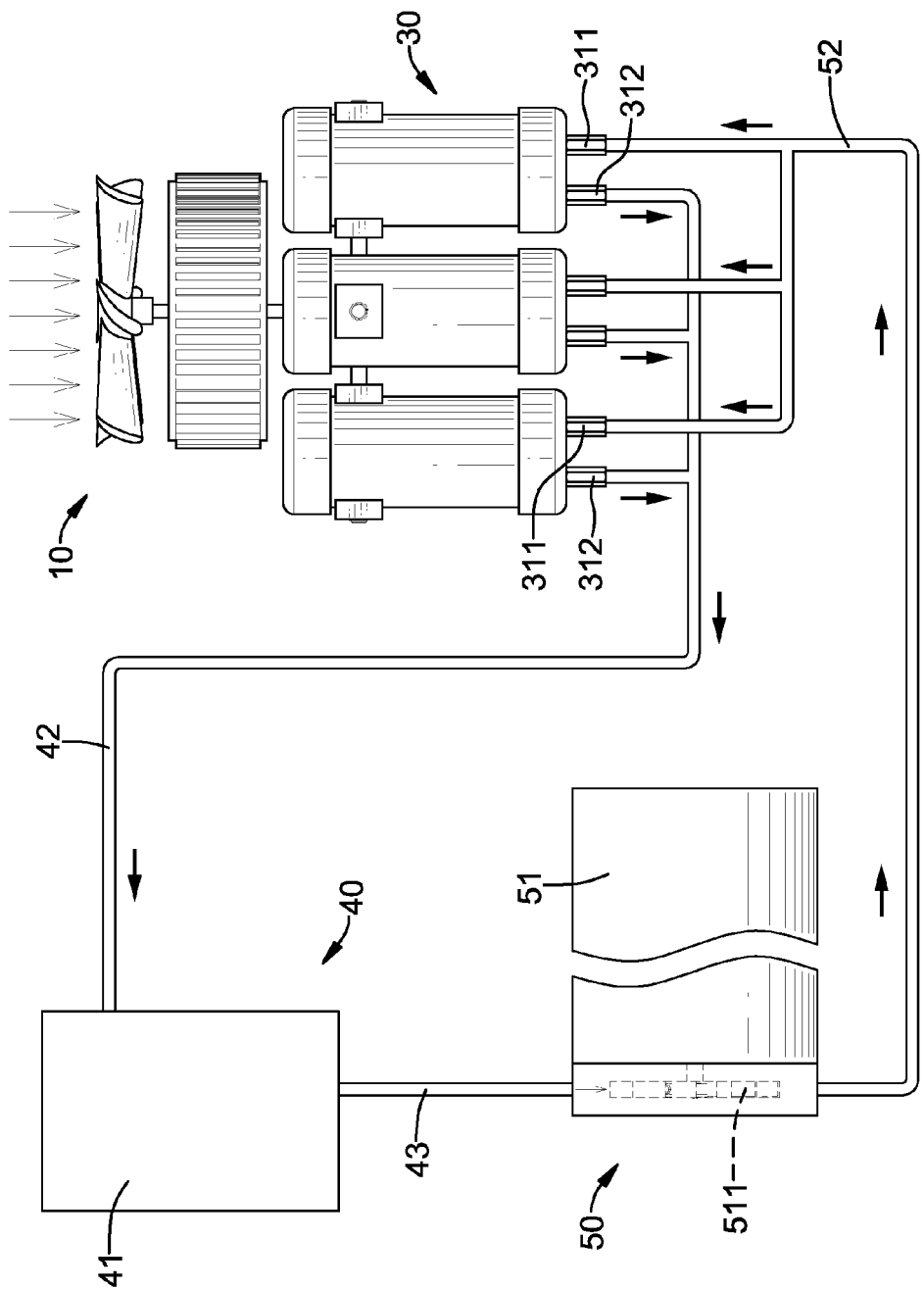
FIG. 1 is a diagram of a first embodiment of a wind-power and hydraulic generator apparatus in accordance with the present invention.
Figure 2:
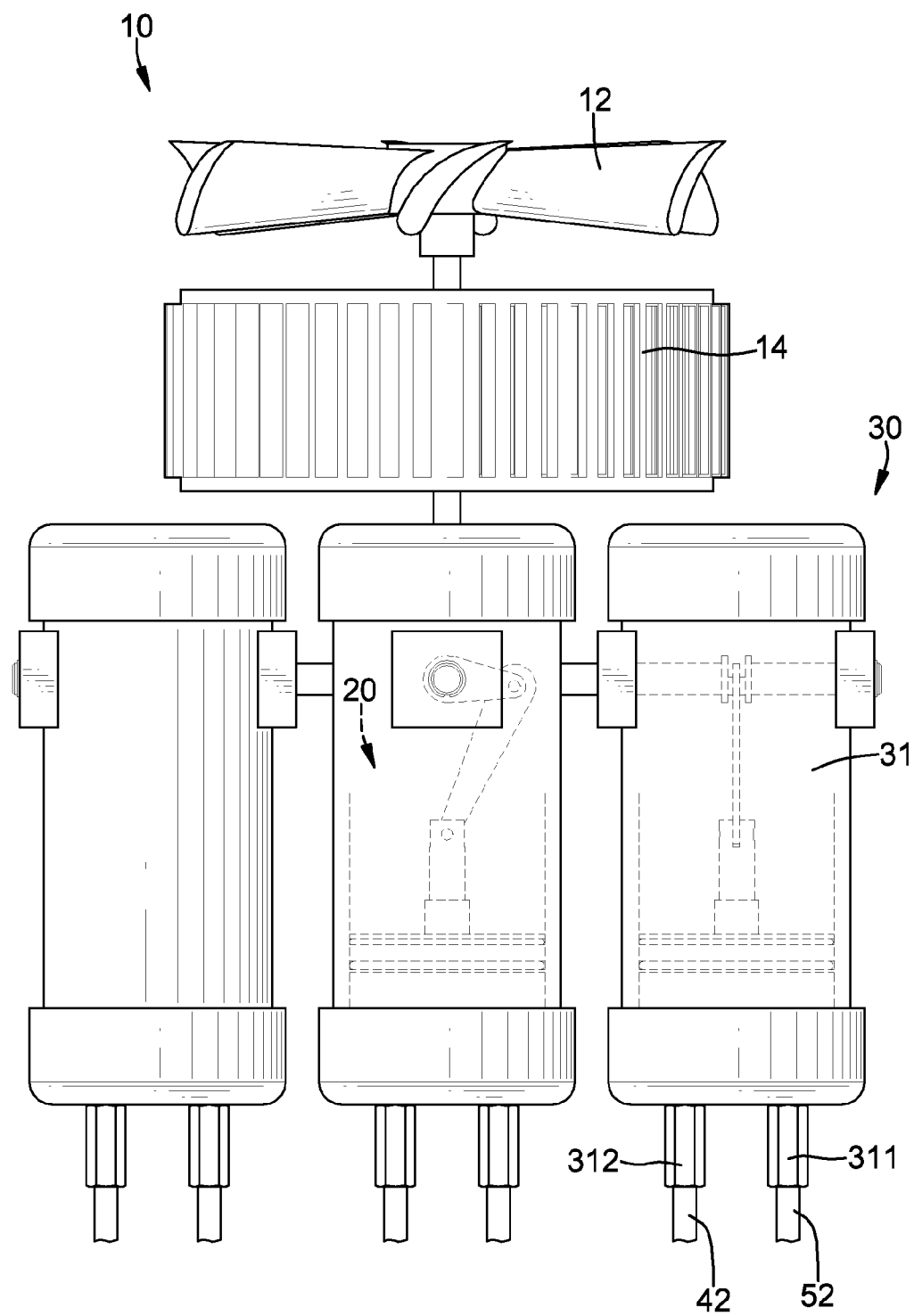
FIG. 2 is an enlarged side view of the wind-power and hydraulic generator apparatus in FIG. 1.
Figure 3:
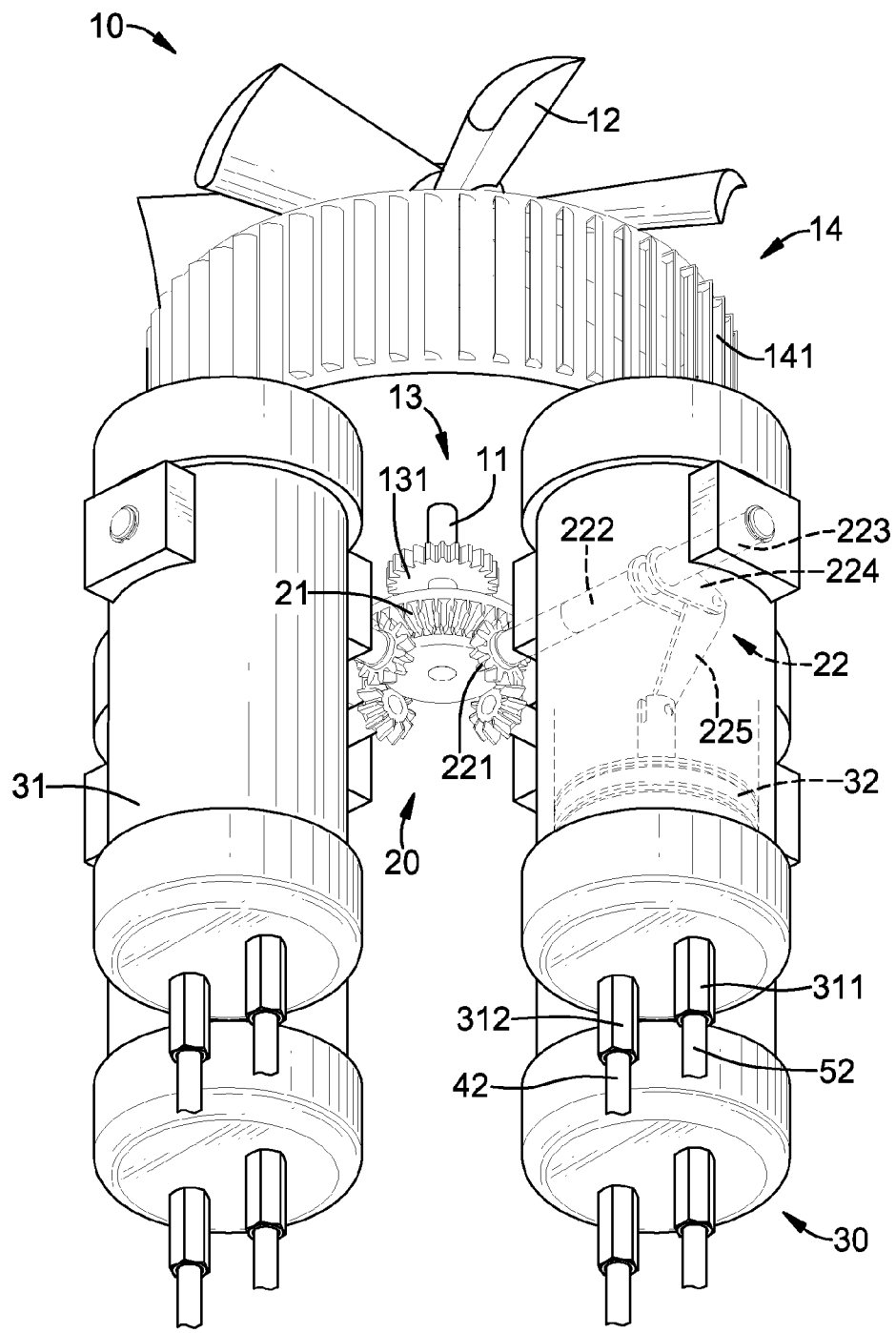
FIG. 3 is a perspective view of the wind-power and hydraulic generator apparatus in FIG. 2.
Figure 4:
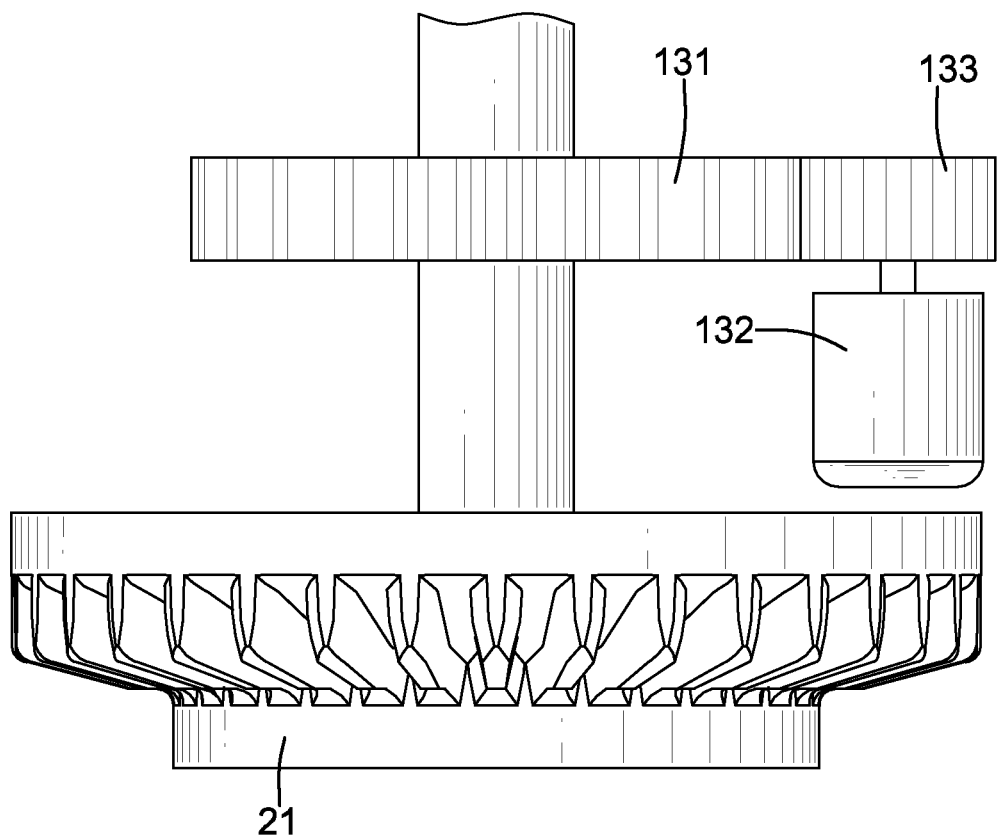
FIG. 4 is an enlarged side view of the wind-power and hydraulic generator apparatus in FIG. 3.

With reference to FIGS. 1 to 4, a first embodiment of a wind-power and hydraulic generator apparatus in accordance with the present invention comprises a wind power device 10, a drive device 20, multiple pump devices 30, a reservoir device 40 and a hydraulic device 50.

The wind power device 10 has an axle 11, a fan 12, a generator unit 13 and an auxiliary wind turbine 14. The fan 12 is mounted securely around the axle 11. The generator unit 13 is connected with the axle 11 and has a wind power generator 132.

Preferably, the generator unit 13 has a first gear 131 and a second gear 133. The first gear 131 is mounted securely around the axle 11. The second gear 133 is connected with the wind power generator 132 and is engaged with the first gear 131. When the wind blows toward the fan 12 along an axial direction of the axle 11, the rotating axle 11 enables the wind power generator 132 to generate electricity with the first gear 131 engaged with the second gear 133.

The auxiliary wind turbine 14 is mounted securely around the axle 11 and has an outer surface and multiple blades 141. The blades 141 are formed on and protrude radially from the outer surface of the auxiliary wind turbine 14. When the wind blows toward the auxiliary wind turbine 14 along a radial direction of the axle 11 instead of toward the fan 12, the auxiliary wind turbine 14 also can drive the axle 11 to rotate.

The drive device 20 is connected with the wind power device 10 and has a first bevel gear 21 and multiple drive units 22. The first bevel gear 21 is mounted securely around the axle 11. The first bevel gear 21 and the fan 12 are respectively mounted securely on two opposite ends of the axle 11. The auxiliary wind turbine 14 and the first gear 131 are located between the first bevel gear 21 and the fan 12.

Each drive unit 22 has a second bevel gear 221, a first shaft 222, a second shaft 223, two crank plates 224 and a rod 225. Each second bevel gear 221 is engaged with the first bevel gear 21. The first shafts 222 are rotatable and are respectively and axially mounted securely with the second bevel gears 221. The second shafts 223 are rotatable and respectively and axially align with the first shafts 222. The crank plates 224 of each drive unit 22 are located between and respectively mounted securely and eccentrically on the first shaft 222 and the second shaft 223 of the drive unit 22. Each rod 225 has a plate end and a piston end opposite to the plate end. The plate end of each rod 225 is located between and pivotally connected with the crank plates 224 of the drive unit 22. Accordingly, when the axle 11 rotates, the first bevel gear 21 rotates to drive the second bevel gears 221, the first shafts 222 and the crank plates 224 to rotate. Consequently, the rods 225 can be moved up and down reciprocatingly. The operating principle and structure of the drive units 22 may be conventional and detailed description is omitted. The present invention does not limit the format of the drive units 22.

The pump devices 30 are respectively connected with the drive units 22. Each pump device 30 has a cylinder 31 and a piston 32. Each cylinder 31 has a main body, an input check valve 311 and an output check valve 312. Each main body is hollow. The first shafts 221 are respectively mounted through the main bodies and the second shafts 222 are respectively mounted in and are respectively inserted into the main bodies.

The input check valves 311 are respectively mounted securely on the main bodies. The output check valves 312 are respectively mounted securely on the main bodies. The pistons 32 are respectively and slidably mounted in the main bodies, are respectively mounted pivotally on the piston ends of the rods 225 and are capable of reciprocating respectively toward the input check valves 311 and the output check valves 312. Therefore, the reciprocating rods 225 can respectively drive the pistons 32 to move up and down reciprocatingly.

The reservoir device 40 is connected with the pump devices 30 and has a reservoir 41, an influx pipe 42 and an efflux pipe 43. The reservoir 41 is hollow. The influx pipe 42 is connected with the reservoir 41 and the output check valves 312. The efflux pipe 43 is connected with the reservoir 41. Preferably, the influx pipe 42 is connected with a top of the reservoir 41.

The hydraulic device 50 is connected with the pump devices 30 and the reservoir device 40 and has a hydraulic generator 51 and a conveying tube 52. The hydraulic generator 51 is connected with the efflux pipe 43 and has a hydraulic turbine 511 toward which water from the efflux pipe 43 jets. The conveying tube 52 is connected with the hydraulic generator 51 and the input check valves 311. Preferably, the efflux tube 43 is connected with a bottom of the reservoir 41.

The wind-power and hydraulic generator apparatus in accordance with the present invention has two operative modes.

1. When the wind blows:

Because the fan 12 or the auxiliary wind turbine 14 drives the axle 11 to rotate, the wind power generator 132 generates and stores electricity. The drive units 22 drive the pistons 32 to reciprocatingly move up and down and pump water in the cylinders 31 into the reservoir 41 via the output check valves 312 and the influx pipe 42. (The reason why the water exists in the cylinders 31 will be explained later.)

The water in the reservoir 41 jets out from the efflux pipe 43 located at the bottom of the reservoir 41 on a principle of minimum potential energy of water. Therefore, the water jet drives the hydraulic generator 51 to generate energy. After driving the hydraulic turbine 511 to rotate, the water which remains in the hydraulic generator 51 flows through the conveying tube 52, the input check valves 311 and into the cylinders 31 (This is why the water exists in the cylinders 31). Consequently, the wind power generator 132 keeps generating and storing electricity and the water keeps circulating to make the hydraulic generator 51 generate electricity when the wind blows.

2. When the wind does not blow:

The electricity stored in the wind power generator 132 enables the wind power generator 132 to drive the second gear 133, the first gear 131 and the axle 11 to rotate when the wind does not blow. Similarly, the drive units 22 drive the pistons 32 to move up and down and the water in the cylinders 31 keeps circulating through the output check valves 312, the influx pipe 42, the reservoir 41, the efflux pipe 43, the hydraulic generator 51 and the conveying tube 52 into the cylinders 31. Consequently, when the wind does not blow, the electricity stored in the wind power generator 132 enables the water to keep circulating and drives the hydraulic generator 51 to keep generating electricity until the electricity stored in the wind power generator 132 runs out.

Figure 5:
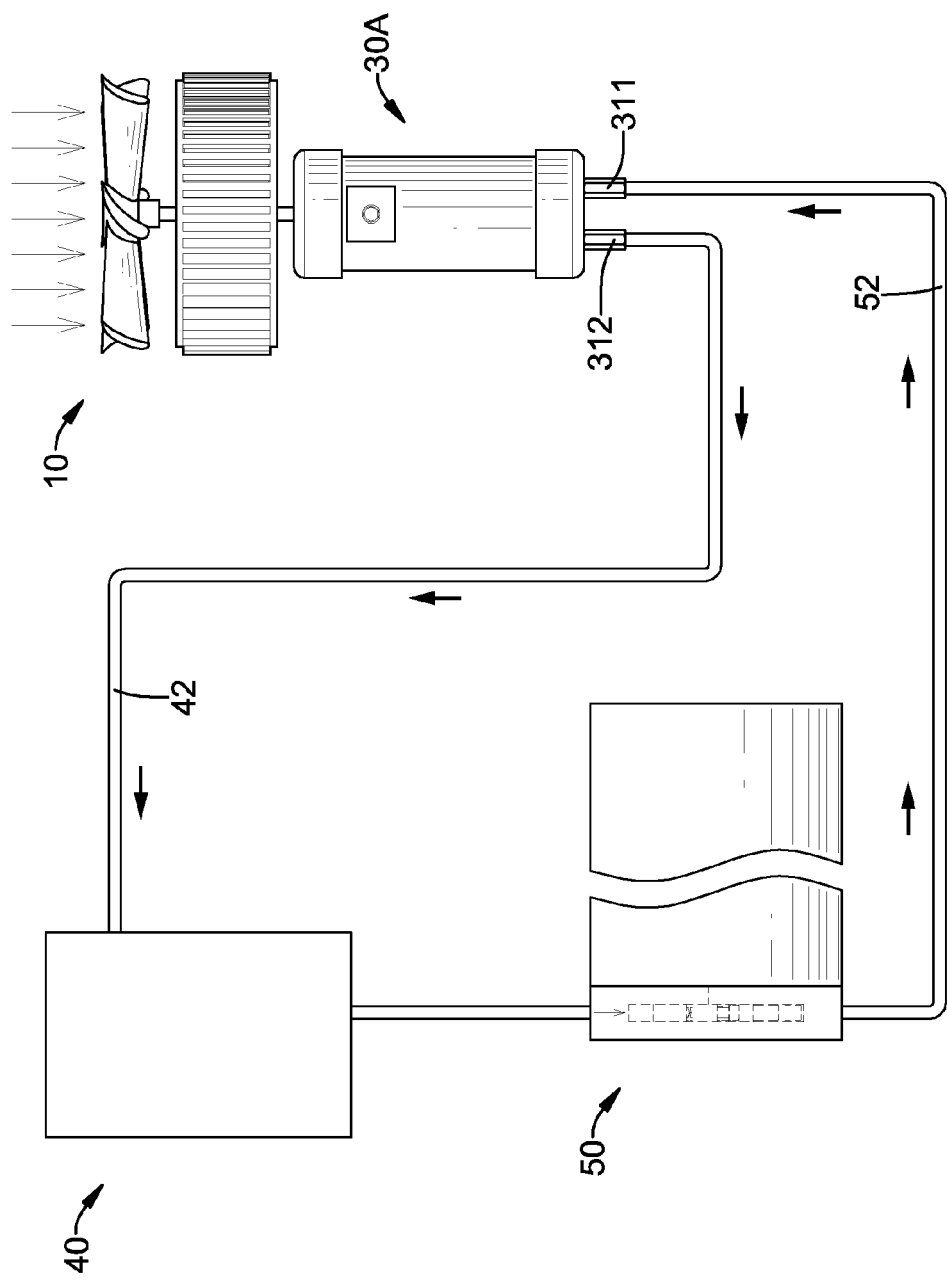
FIG. 5 is a diagram of a second embodiment of the wind-power and hydraulic generator apparatus in FIG. 1.

With reference to FIG. 5, a second embodiment of the wind-power and hydraulic generator apparatus in accordance with the present invention is substantially the same as the first embodiment, except that only a single pump device 30A and a single drive unit are implemented.

From the above description, it is noted that the present invention has the following advantage: whether the wind blows or not, the water in the present invention can keep circulating to generate a water jet and the hydraulic generator 51 can keep generating electricity. The present invention does not need to be fed on extra electricity to generate a water jet and is economically efficient and ecologically friendly.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wind-power and hydraulic generator apparatus comprising:
 a wind power device having
  an axle;
  a fan mounted securely around the axle; and
  a generator unit connected with the axle and having a wind power generator;
 a drive device connected with the wind power device and having
  a first bevel gear mounted securely around the axle; and
  multiple drive units, each drive unit having
   a second bevel gear engaged with the first bevel gear;
   a rotatable first shaft axially mounted securely with the second bevel gear;
   a rotatable second shaft axially aligning with the first shaft;
   two crank plates located between and respectively mounted securely and eccentrically on the first shaft and the second shaft; and
   a rod having
    a plate end located between and pivotally connected with the crank plates; and
    a piston end opposite to the plate end;
 multiple pump devices respectively connected with the drive units, each pump device having
  a cylinder having;
   a hollow main body, wherein the first shaft is mounted through the main body and the second shaft is mounted in and is inserted into the main body;
   an input check valve mounted securely on the main body; and
   an output check valve mounted securely on the main body; and
  a piston slidably mounted in the main body, mounted pivotally on the piston end of the rod and capable of reciprocating toward the input check valve and the output check valve;
 a reservoir device connected with the pump devices and having
  a hollow reservoir;
  an influx pipe connected with the reservoir and the output check valves; and
  an efflux pipe connected with the reservoir; and
 a hydraulic device connected with the pump devices and the reservoir device and having
  a hydraulic generator connected with the efflux pipe and having a hydraulic turbine toward which water from the efflux pipe jets; and
  a conveying tube connected with the hydraulic generator and the input check valves.

2. The wind-power and hydraulic generator apparatus as claimed in claim 1, wherein
 the generator unit has
  a first gear mounted securely around the axle; and
  a second gear connected with the wind power generator and engaged with the first gear.

3. The wind-power and hydraulic generator apparatus as claimed in claim 1, wherein the wind power device further has
 an auxiliary wind turbine mounted securely around the axle and having
  an outer surface; and
  multiple blades formed on and protruding radially from the outer surface of the auxiliary wind turbine.

4. The wind-power and hydraulic generator apparatus as claimed in claim 2, wherein the wind power device further has
   an auxiliary wind turbine mounted securely around the axle and having
   an outer surface; and
   multiple blades formed on and protruding radially from the outer surface of the auxiliary wind turbine.

\* \* \* \* \*